UNITED STATES PATENT OFFICE.

JOSEPH W. WATTLES, OF CANTON, MASSACHUSETTS.

IMPROVEMENT IN COMPOSITIONS FOR SIZING YARN.

Specification forming part of Letters Patent No. 168,435, dated October 5, 1875; application filed January 20, 1875.

*To all whom it may concern:*

Be it known that I, JOSEPH W. WATTLES, of Canton, of the county of Norfolk, of the State of Massachusetts, have invented a new and useful Composition for or Improvement in Composition for Sizing Yarn; and do hereby declare the same to be fully described as follows:

In carrying out my invention I take eighty gallons of water, thirty pounds of starch, and one pint of acetic acid. The water is first to be heated from 180° to 200° Fahrenheit, or higher if desirable. The acetic acid and starch are next to be added to it, and the whole to be thoroughly stirred.

The principal object of the acetic acid is to keep the particles of starch in suspension in the water, or to prevent their subsidence therein, which is very apt to occur, more especially on fermentation taking place.

The acetic acid I have found to greatly improve the sizing or solution of starch. It renders it more adhesive, which causes the fibers of yarn to be cemented down firmer, comparatively speaking, during the dressing process. Besides, it causes the solution of starch to glaze the yarn better and to dry quicker than it will without the acid. Furthermore, the yarn dressed with the acidulated solution is found to work much better in the weaving process, and to make stronger and better cloth, particularly as the sizing made with the acid is not so liable, while the yarn is being woven, to be chafed or rubbed off it.

I do not intend to confine my sizing composition to the precise proportions of its ingredients as hereinbefore stated, for such may be somewhat varied without materially affecting the character or utility of the composition.

I find that, with the acetic acid, some thirty-three per cent. of starch is saved, for, under ordinary circumstances, or without the acid, forty pounds of the starch to eighty gallons of water would be required, whereas with the acid but thirty pounds of the starch will suffice to produce as good, if not a better, dressing or sizing.

By adding the acid to a common solution of starch in a fermented state, the tendency of the starch to subside is nearly, if not entirely, prevented, and the sizing is greatly improved in other respects.

I therefore claim—

As an improvement in the manufacture of a sizing or dressing for yarn, the composition hereinbefore explained, consisting of a solution of starch, whether in a fermented or unfermented state, and a quantity of the acid, as described, such being as and for the object or purposes as hereinbefore explained.

JOSEPH WARREN WATTLES.

Witnesses:
   R. H. EDDY,
   J. R. SNOW.